May 26, 1959 J. H. DAGGETT 2,888,179
POURING AND CARRYING ADAPTER FOR MILK CARTONS
Filed April 15, 1957 2 Sheets-Sheet 1
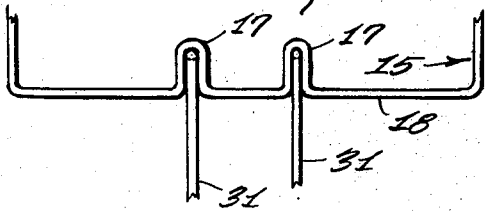
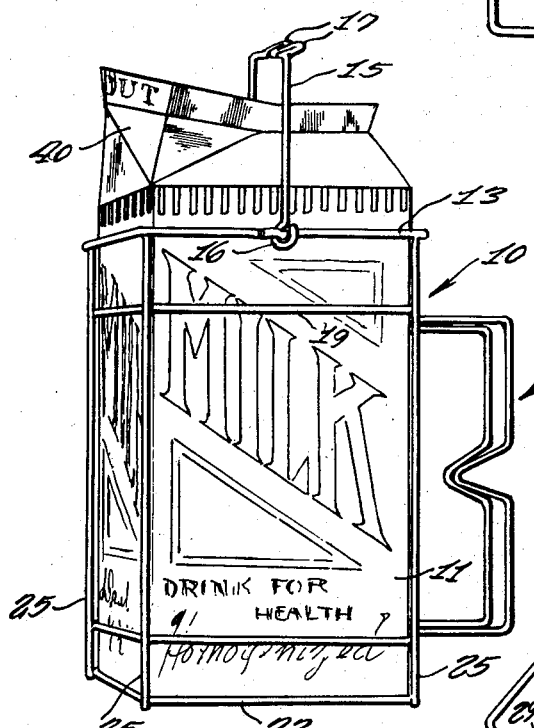
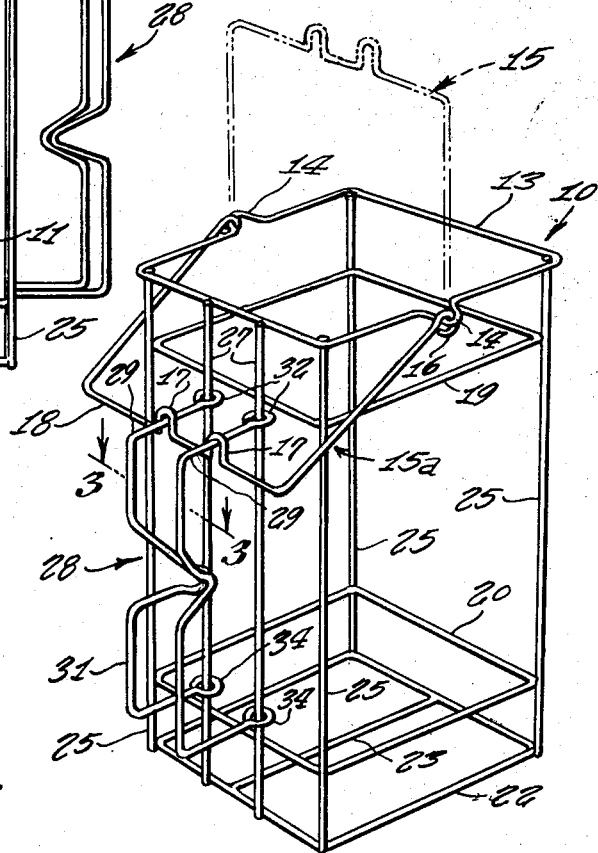
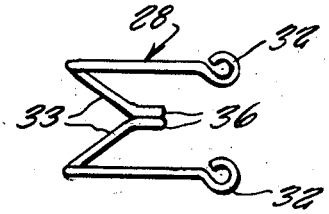
INVENTOR.
JOHN H. DAGGETT
BY
Carl Miller
ATTORNEY

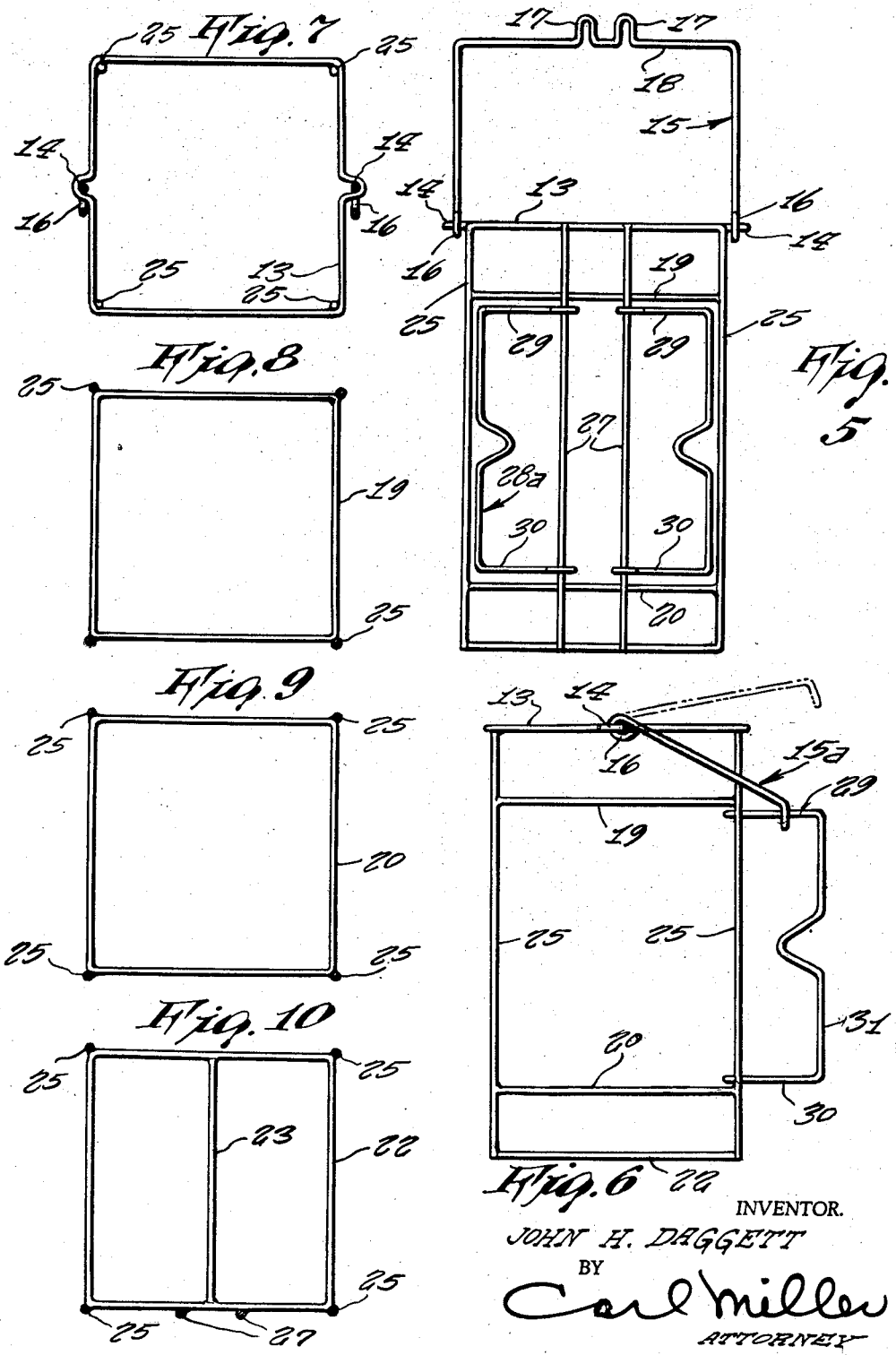

United States Patent Office 2,888,179
Patented May 26, 1959

2,888,179

POURING AND CARRYING ADAPTER FOR MILK CARTONS

John H. Daggett, Akron, Ohio

Application April 15, 1957, Serial No. 652,907

3 Claims. (Cl. 224—45)

This invention relates to handling equipment and, more particularly, a device for attachment to a milk container for facilitating the carrying use thereof.

Various types of milk containers, such as cardboard cartons and bottles, are usually inconvenient to carry and use in that they are slippery and often fall while being carried or used.

It is an object of the present invention therefore to provide an adapter for milk containers which removably supports the container therein and has a handle for carrying the container and a handle for pouring the contents therefrom.

Another object of the present invention is to provide an adapter for milk containers that is simple in construction, efficient in operation, and which can be selectively used to either carry the container or pour the contents therefrom.

A still further object of the present invention is to provide an adapter for the aforementioned purposes that may be manufactured in large quantities at relatively low cost and which may be used to support various other types of fluid containers.

All of the foregoing and still further objects and advantages of this invention will become apparent from a study of the following specification, taken in connection with the accompanying drawing, wherein:

Figure 1 is a perspective view of a device made in accordance with the present invention in operative use;

Figure 2 is a perspective view of the device shown in Figure 1, with the container removed therefrom;

Figure 3 is an enlarged cross sectional view taken along line 3—3 of Figure 2;

Figure 4 is an enlarged fragmentary top elevational view of the device shown in Figure 2;

Figure 5 is a rear elevational view of the device shown in Figure 2;

Figure 6 is a side elevational view of the device shown in Figure 2; and

Figures 7 to 10 are top plan views of various framing elements forming a part of the present invention.

Referring now to the drawing, and more particularly to Figures 1 and 2 thereof, a container carrier and pouring adapter 10 made in accordance with the present invention is shown in operative use with a cardboard milk carton 11. This device includes a top frame 13 which is provided with a pair of outwardly extending ears 14 at each side for rotatably supporting a U-shaped bail member 15 having associated eyes 16 at the free end of each side. The base 18 of the bail is provided with a pair of centrally located reentrant portions 17 for purposes hereinafter described. The device also includes a bottom frame 22, an upper central frame 19, and a lower central frame 20. A plurality of corner rods or risers 25 extend between the respective frames to maintain them in spaced parallel relationship so as to define a cubical receptacle. The bottom frame 22 is provided with a transversely extending crossbar 23 that prevents the passage of the carton through the lower end thereof, while the upper frame 13 is completely open so as to permit the insertion of the milk carton therein.

A pair of auxiliary rods 27 are secured to one side of each of the frames, as shown in Figure 2, for rotatably supporting a handle assembly 28. This assembly includes a pair of similar U-shaped members, each having an upper side leg 29 and a lower side leg 30 connected together by a base 31. Each of the upper and lower side legs 29, 30 is provided with eyes 32, 34, respectively for rotatably receiving the auxiliary rods 27 to permit the U-shaped handle members to be rotated between an operative and an inoperative position. The central portion of each of the bases 31 is provided with a V-shaped angularly related portion 33, as shown in Figure 3, which is terminated in a flat base portion 36. These portions 36 act as stops to limit rotation of the handle members toward each other out of parallelism when moved to the operative position.

In use, the bail 15 functions as a handle so that the milk container may be carried from place to place in a convenient and safe manner. However, when it is desired to pour the contents of the container outwardly through the spout 40, the bail 15 is rotated rearwardly to the inoperative position 15a, simultaneously with the movement of the U-shaped handle members out of flush engagement with the adjacent side of the device from the inoperative position 28a to the extended operative position 28 shown in Figure 2. The bail 15 is then rotated downwardly onto the top of the handle assembly so that the upper side legs 29 of each handle member are received within the reentrant portions 17 of the bail 15. This engagement maintains the handle assembly in the operative position 28 until the bail 15 is lifted to carry the container in the transport position, at which time the handle members may be rotated to the flush inoperative position 28a.

Having thus described my invention, I claim as new and desire to secure by Letters Patent:

1. A pouring and carrying adapter comprising, in combination, a plurality of vertically spaced parallel frames, a plurality of main risers connected to said frames for securing said frames in said spaced relationship to define a tubular skeleton framework for removably receiving a milk container of similar cross sectional configuration, the lowermost of said frames having means for preventing the passage of a container therethrough, a bail rotatably carried by the uppermost of said frames, a pair of auxiliary risers parallel to and intermediate a pair of said main risers, and a handle assembly carried by said auxiliary risers comprising a pair of U-shaped members, each of said members comprising a base and a pair of parallel side legs, the free ends of said side legs of each U-shaped member being rotatably secured to one of said auxiliary risers, and the central portion of the base of each said U-shaped member including an offset V-shaped portion angularly related to the plane of each said respective member and extending in a direction toward the V-shaped portion of the other of said pair of U-shaped members.

2. A pouring and carrying adapter as set forth in claim 1, wherein said U-shaped members are rotatable between a collapsed position adjacent to said skeleton and an outwardly extended position in which said V-shaped portions are engaged with each other to maintain said U-shaped members in spaced parallel relationship.

3. A pouring and carrying adapter as set forth in claim 2, wherein said bail includes a base having a pair of spaced reentrant portions spaced apart a distance corresponding to the distance between said U-shaped members of said handle, said reentrant portion when said bail is rotated to a collapsed position receiving the adjacent legs of said U-shaped members to prevent rotation of each of said members.

References Cited in the file of this patent

UNITED STATES PATENTS

| | | |
|---|---|---|
| 440,205 | Smith | Nov. 11, 1890 |
| 1,861,368 | Sorrentino | May 31, 1932 |
| 2,300,745 | Jenkins | Nov. 3, 1942 |
| 2,775,373 | Coralline | Dec. 25, 1956 |

FOREIGN PATENTS

| | | |
|---|---|---|
| 186,869 | Great Britain | Oct. 12, 1922 |